United States Patent [19]

Roza

[11] 4,251,886

[45] Feb. 17, 1981

[54] TRANSMISSION SYSTEM FOR THE TRANSMISSION OF DATA PULSES

[75] Inventor: Engel Roza, Eindhoven, Netherlands

[73] Assignee: U.S. Philips Corporation, New York, N.Y.

[21] Appl. No.: 106,819

[22] Filed: Dec. 26, 1979

Related U.S. Application Data

[63] Continuation of Ser. No. 917,973, Jun. 22, 1978, abandoned.

[30] Foreign Application Priority Data

Apr. 28, 1978 [NL] Netherlands .......................... 7804575

[51] Int. Cl.³ ............................................ H04L 25/34
[52] U.S. Cl. ...................................... 375/18; 375/103
[58] Field of Search ....................... 375/4, 17, 18, 103; 364/572, 574, 724, 825; 371/56

[56] References Cited

U.S. PATENT DOCUMENTS

| | | | |
|---|---|---|---|
| 3,492,578 | 1/1970 | Gerrish et al. | 375/18 |
| 3,601,701 | 8/1971 | Lender | 371/56 |
| 3,611,143 | 10/1971 | Gerwen | 375/39 |
| 3,947,767 | 3/1976 | Koike et al. | 375/18 |

Primary Examiner—Benedict V. Safourek
Attorney, Agent, or Firm—Thomas A. Briody; William J. Streeter; Edward W. Goodman

[57] ABSTRACT

A transmission system for the transmission of data pulses from a transmitter to a receiver through a transmission medium, the transmitter comprising a pulse source connected to the transmission medium for applying n-valent pulses to the transmission medium, which pulses, when passing through the transmission medium give rise to the occurrence of intersymbol interference, these pulses furthermore being affected by noise, wherein the receiver includes a pulse repeater, connected to the transmission medium, with quantized feedback.

3 Claims, 10 Drawing Figures

Fig. 3a
$$H_1(s) = \frac{-0{,}07s^3 + 0{,}16s^2 + 0{,}22s + 0{,}0015}{(s^2 + 0{,}1s + 0{,}022)(s^2 + 0{,}167s + 0{,}236)}$$

Fig. 3b
$$G_1(s) = \frac{1{,}02s^3 + 0{,}44s^2 + 0{,}167s - 0{,}008}{(s^2 + 0{,}1s + 0{,}022)(s^2 + 0{,}167s + 0{,}236)}$$

Fig. 8a
$$H_2(s) = \frac{(s+0.00353)(s+0.0614+j1.253)(s+0.0614-j1.253)}{(s+0.082+j0.0877)(s+0.082-j0.0877)(s+0.226+j0.412)(s+0.226-j0.412)}$$

Fig. 8b
$$G_2(s) = \frac{(s-0.0288)(s+0.356+j0.360)(s+0.356-j0.360)}{(s+0.082+j0.0877)(s+0.082-j0.0877)(s+0.226+j0.412)(s+0.226-j0.412)}$$

TRANSMISSION SYSTEM FOR THE TRANSMISSION OF DATA PULSES

This is a continuation of application Ser. No. 917,973, filed June 22, 1978, now abandoned.

BACKGROUND OF THE INVENTION (1) Field of the Invention

The invention relates to a transmission system for the transmission of data pulses from a transmitter to a receiver through a transmission medium, wherein the transmitter comprises a pulse source connected to the transmission medium for applying n-valent pulses to the transmission medium, which pulses, when passing through the transmission medium, give rise to the occurrence of intersymbol interference, these pulses furthermore being affected by noise, wherein the receiver comprises a pulse repeater, connected to the transmission medium, with quantized feedback, comprising a forward filter connected between the transmission medium and an input of a difference former, a pulse regenerator connected to the output of the difference former and a clock pulse source, and comprising a feedback filter connected between the output of the pulse regenerator and a second input of the difference former, wherein means are provided between the pulse source and the transmission medium, in the transmission medium itself and between the transmission medium and the forward filter such that a transmission channel having a uniform transmission characteristic is present between the pulse source and the forward filter, which transmission channel may be limited between a lower cut-off frequency differing from zero and a higher cut-off frequency differing from infinity.

Such transmission systems with quantized feedback are particularly suitable for use in situations wherein the transmission channel suppresses certain signal frequencies owing to band limitation. A relevant example is the blocking of d.c. current by transformers in cable links. In such systems the d.c. current component of the transmitted data pulses can be restored in the receiver by quantized feedback. This enables the transmission of pulses without modulation of a carrier, that is to say in baseband.

Furthermore it has been shown in the prior art that optimal non-linear equalization of a transmission path furnishes a higher signal-to-noise ratio and a smaller intersymbol interference than optimal linear equalization. A field in which transmission systems with quantized feedback is used is the transmission through coaxial cables which hitherto predominantly use linear equalization in combination with redundancy codes which suppress the d.c. current component. A special form thereof are the so-called hybrid systems in which a plurality of analog line amplifiers are included between two consecutive pulse repeaters.

(2) Description of the Prior Art

The book Data Transmission by W. R. Bennett and J. R. Davey, published by McGraw-Hill, 1965, pp. 274-275, describes a transmission system in which the transmission channel has a high-pass character. In the receiver the low-frequency signal components are corrected by quantized feedback, utilizing a second order lowpass filter with discrete components.

The article by A. C. Salazar, published in Bell System Technical Journal, March 1974, pp. 503-523 discloses a design of the transmitter and receiver filters in the form of finite non-recursive discrete-time filters. These filters must counteract the ambient noise and the precursors of the pulses. The limiting factor in the design is the quantity of intersymbol interference—caused by the postcursors of the pulses—which must be eliminated by the quantized feedback. As described in the article, one single erroneous decision in the receiver may lead to a burst of errors if the sizes of the precursors are large.

SUMMARY OF THE INVENTION

It is an object of the invention to realize the forward filter and the feedback filter as recursive filters having three or more poles in the transfer function. In the range of high and very high frequencies in which time-discrete filters are still difficult to implement, it will then be possible to use conventional time-continuous recursive filters.

So it is also an object of the invention to extend the use of quantized feedback to the range of high and very high frequencies. However, the invention is not limited to this feature as the recursive filters with three or more poles can also be realized as time-discrete recursive filters, albeit, for the time being, for the lower frequencies only.

The transmission system according to the invention is characterized in that the forward filter and the feedback filter are implemented as recursive filters having three or more poles in the transfer function, which are the same for both filters, and in that the numerator polynomial $N_h(s)$ of the transfer function of the forward filter and the numerator polynomial $N_g(s)$ of the transfer function of the feedback filter are coupled by the group of K linear equations:

$$N_g(s_k) = N_h(s_k)\exp(s_k\tau) \quad k=1, 2 \ldots K$$

where K exceeds two, wherein $s_k$ represents the poles of the transfer function, K represents the number of poles and $\tau$ represents the instant at which the regenerated pulse is applied to the feedback filter.

A further object of the invention is to provide a recursive forward filter which minimizes the ratio of the intersymbol interference and the ambient noise to the signal, particularly in the case of band limitation. In this case a complete compensation of the postcursors of the pulses by the quantized feedback through the above-defined feedback filter is not possible. So it is an object of the invention to provide, when the above described relationship between the feedback filter and the forward filter is used, an optimal forward filter for a band-limited transmission channel. For particulars we refer to the claims.

SHORT DESCRIPTION OF THE FIGURES

FIG. 6 shows a second transmission system according to the invention.

FIRST EMBODIMENT

Figure 1:
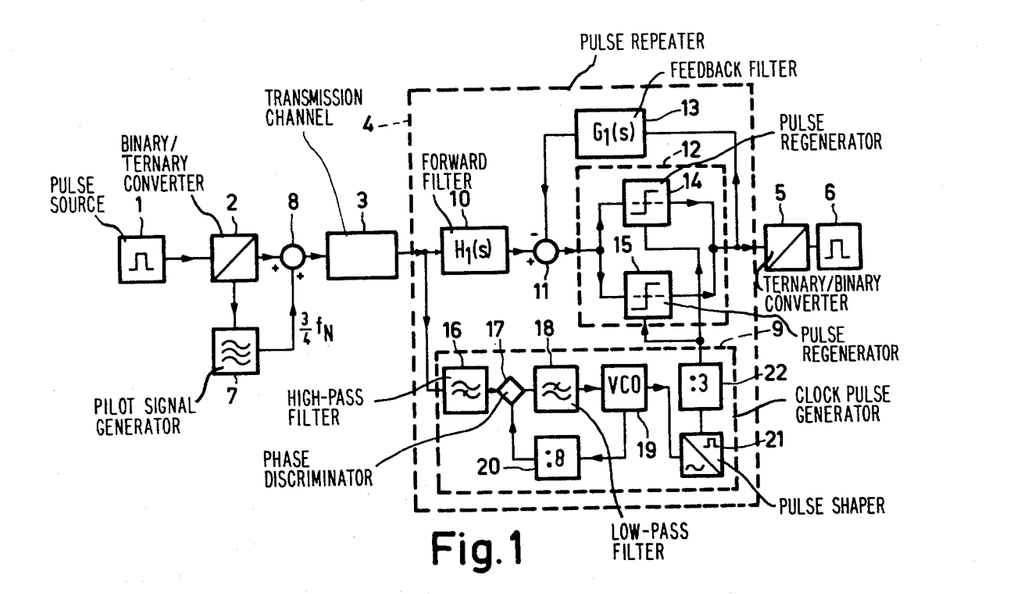
FIG. 1 shows a first transmission system according to the invention.

FIG. 1 illustrates a transmission system for the transmission of data pulses, the elements of which will be briefly described.

It comprises a pulse source 1 of binary data pulses which are converted into ternary pulses by code converter 2 to enable their supply to transmission channel 3.

The other end of the transmission channel 3 is connected to a pulse repeater 4 which regenerates the received ternary pulses and applies them to the code converter 5, which converts the ternary pulses into binary pulses to enable their supply to the pulse user 6.

A pulse source 1 having a bit rate of 2 Mb/s and a transmission channel having a bandwidth of 12 kHz–552 kHz which includes two secondary FDM-groups of a carrier telephony system will be described by way of example. This frequency band is illustrated in FIG. 2 on a normalized frequency scale.

The code converter 2 is of the type 3B/2T, that is to say that three binary pulses are converted into two ternary pulses. The symbol rate at the output is, consequently, 1.33 Mbaud. The Nyquist frequency $f_N$ is in this case $f_N = 666$ kHz. This frequency occurs as the normalization factor in FIG. 2.

Figure 2:
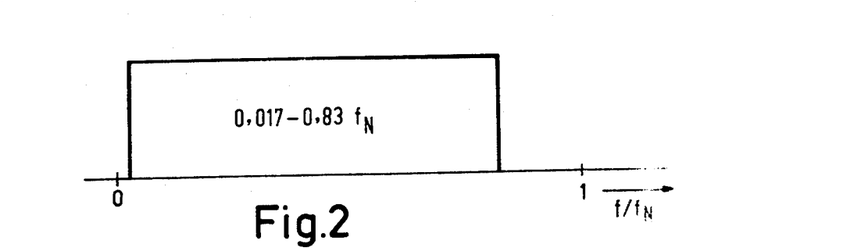
FIG. 2 illustrates the transmission channel frequency band.

FIG. 2 shows that the frequency bandwidth of transmission channel 3 is smaller than the Nyquist frequency.

The pulse repeater 4 comprises a forward filter 10 which is characterized by the transfer function $H_1(s)$ and connected between transmission channel 3 and an input (+) of difference former 11. The output of difference former 11 is connected to the input of a pulse regenerator 12 for ternary pulses. A feedback filter 13 which is characterized by the transfer function $G_1(s)$, is connected between the output of pulse regenerator 12 and a second input (−) of difference former 11.

The pulse regenerator 12 comprises two pulse regenerators 14 and 15, which are arranged in parallel with the inputs and outputs and controlled by the clock pulses of clock pulse generator 9, occurring at the symbol frequency of 1.33 M pulses per second. One pulse regenerator 14 regenerates the positive pulses and the other pulse regenerator 15 regenerates the negative pulses. The output signals of the pulse regenerators 14 and 15 are combined for producing a regenerated ternary signal at the output of pulse regenerator 12.

In the transmitter, adder 8 adds a pilot signal having a frequency $f_p = \frac{3}{4}f_N = \frac{3}{8}f_s$ ($f_s$ = symbol frequency = 1.33 MHz) to the ternary output signal of code converter 2. The pilot signal will be of a suitable low level relative to the ternary line signal in order to interfere only little therewith.

The pilot signal is obtained from a pilot signal generator 7 which is synchronized with the internal clock (frequency $f_s$) of code converter 2, which determines the instants at which the ternary output pulses occur. The pilot signal can be derived in a suitable manner from this internal clock by dividing the frequency thereof by the factor: 8 and by thereafter multiplying it by the factor: 3.

In clock pulse generator 9 the pilot signal is filtered by high-pass filter 16 and then applied to a phase locked loop comprising a phase discriminator 17, a low-pass filter 18, a voltage-controlled oscillator (VCO) 19 and a frequency divider 20 having a dividing factor: 8. This phase locked loop synchronizes the frequency of oscillator 19 to a frequency which is equal to eight times the pilot frequency and so equal to three times the symbol frequency of 1.33 MHz. After conversion by pulse shaper 21 of the output signal of oscillator 19 into a pulse train of the same frequency the frequency is divided by the frequency divider 22 by the factor: 3. A series of clock pulses having a pulse repetition rate of 1.33 M pulses per second then appears at the output of frequency divider 22, which coincides with the output of clock pulse generator 9.

The transmission channel 3 comprises, for example, two secondary FDM-groups and it will be assumed that the transmission channel comprises all the means for effecting a uniform transfer characteristic between pulse source 1 and the pulse repeater 4. These devices are controlled and non-controlled analog line amplifiers, filters and equalizers which are of a conventional type for carrier telephony systems.

The principle of quantized feedback are already well-founded and need not be repeated here. The publication by the International Conference on Communication, 1972, Philadelphia, pp. 22–12 to 22–17 contains a survey of 74 publications.

It may be brought to mind that any output pulse of pulse regenerator 12 produces a pulse response at the output of filter 13 which is subtracted from the output signal of filter 10 by difference former 11 to reduce the intersymbol interference at the subsequent pulses of transmission channel 3.

Under certain conditions the pulse response of the feedback filter is equal to the pulse response of the forward filter from a given instant thereof. This instant is in any case located after the sampling instant $t_o$ of the pulse response of the forward filter and prior to the next sampling instant occurring a symbol period T later. The specific instant is indicated by $\tau = t_o + \alpha T$ where $0 < \alpha < 1$.

The transfer functions of the filters are written as the quotient of a numerator polynomial and a denominator polynomial:

$$H_1(s) = N_h(s) D_h(s)$$

$$G_1(s) = N_g(s)/D_g(s).$$

The first condition is that the denominator polynomials are equal:

$$D_h(s) = D_g(s) = D(s) \tag{1}$$

The zeros of the denominator polynomial (poles of the transfer function) are indicated by $s_k$.

The second condition is that there is the following relation between the numerator polynomials for all poles $s_k$:

$$N_g(s_K) = N_h(s_k)\exp(s_k\tau) \tag{2}$$

If these two conditions are satisfied the pulse response of the forward filter is fully compensated from an instant $\tau$ onwards by the pulse response of the feedback filter for all values of the time. The variable $\tau$ makes it possible to take the delay in pulse regenerator 12 into account.

Figure 3A:
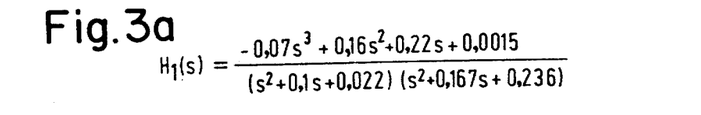
FIG. 3 shows the transfer functions of the forward filter and the feedback filter.
Figure 3B:
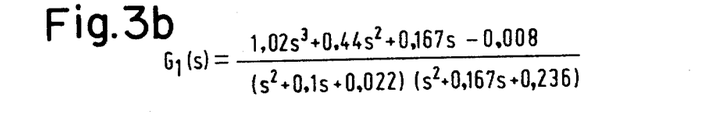

A suitable transfer function $H_1(s)$ is shown in FIG. 3a, and FIG. 3b shows the associated transfer function $G_1(s)$ for $\tau=1.5\ T$. In these expressions s represents the normalized frequency variable $s=j\omega/\omega_N$.

Figures 4A, 4C:
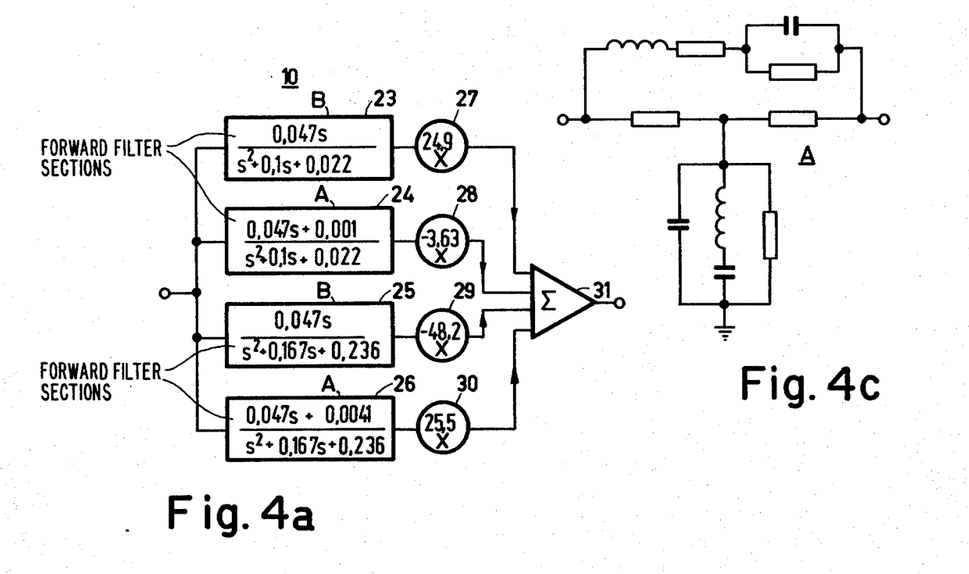
FIG. 4 shows the implementation of the filters.
Figures 4B, 4D:
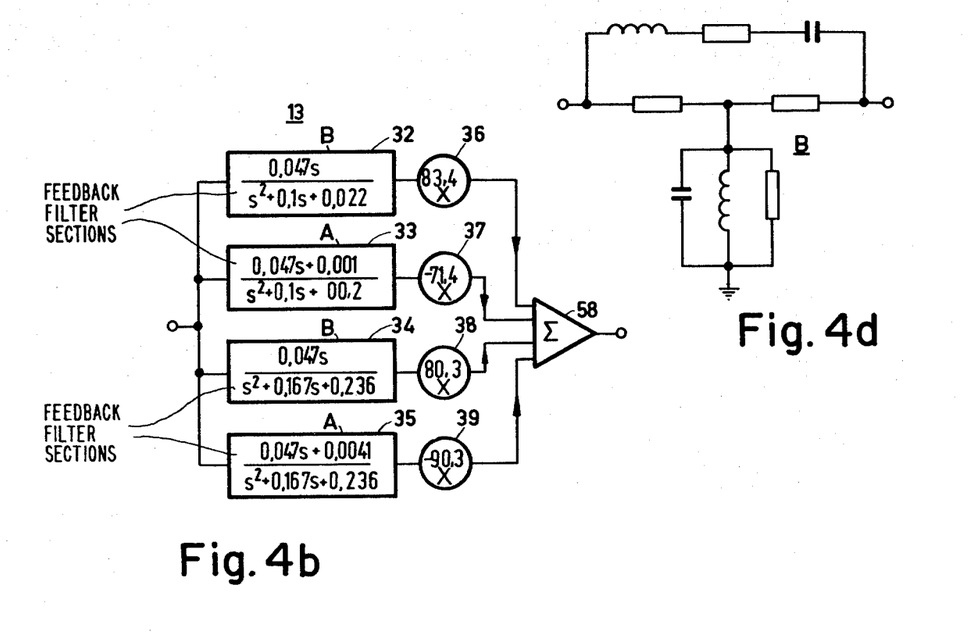

FIG. 4a illustrates the implementation of the forward filter and FIG. 4b illustrates the implementation of the feedback filter.

The forward filter 10 is divided into four filter sections 23, 24, 25 and 26 having the transfer functions, indicated in the Figure, which have been combined by means of the multipliers 27, 28, 29 and 30 having the multiplication factors indicated in the Figure and the adder 31.

The feedback filter 13 is divided in a similar manner into four filter sections 32, 33, 34, 35 which have been combined by means of the multipliers 36, 37, 38 and 39 and adder 58.

The filter sections may be implemented as LCR filters of a type A, illustrated in FIG. 4c or a type B, illustrated in FIG. 4d, in accordance with the type indications A and B in FIGS. 4a and b, using conventional filter synthesis.

Figures 5, 6A, 6B:
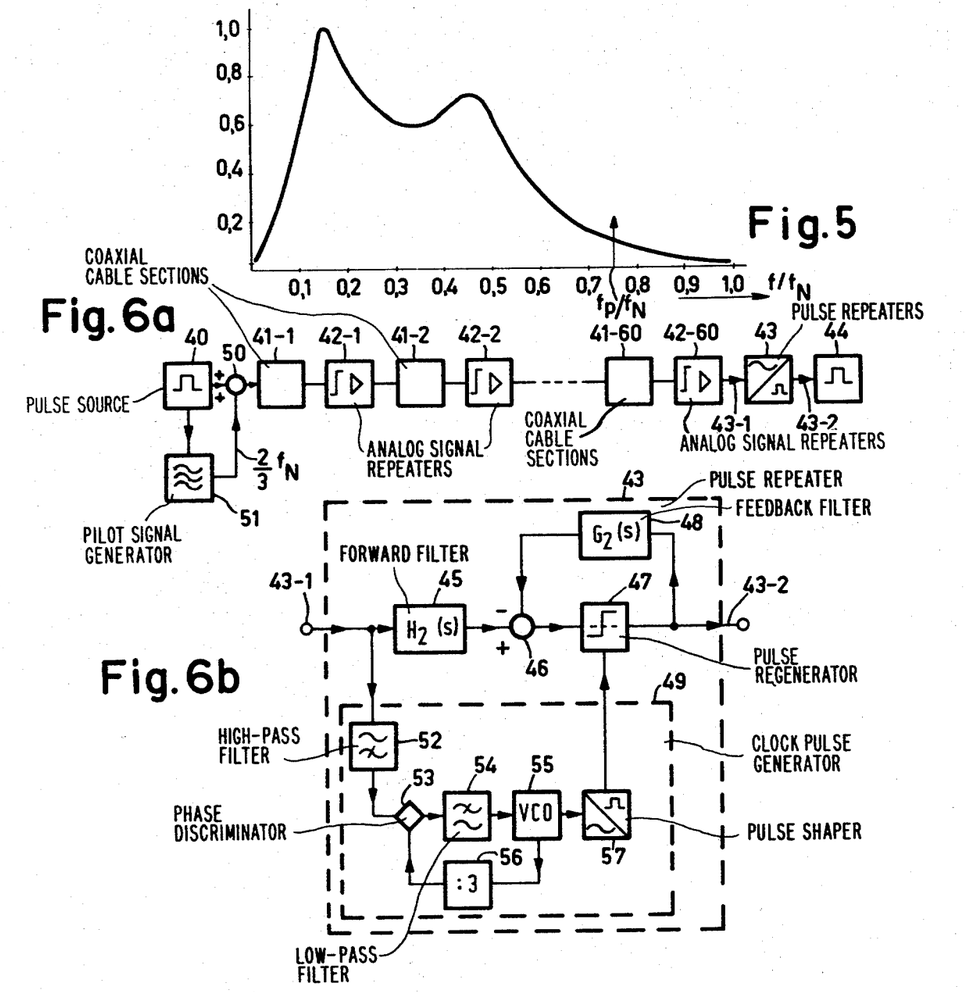
FIG. 5 illustrates the forward filter characteristic.

FIG. 5 shows the amplitude-frequency characteristic of the forward filter shown in FIG. 4a on a relative amplitude and frequency scale. The place of the pilot frequency $f_p = \frac{3}{8}f_N$ is shown in this FIG. 5. It can be seen that in this position the forward filter 10 has already attenuated the pilot signal to a relatively high degree so that the pilot signal, which is already transmitted with a suitable low level, will not interfere to any worthwhile extent with the ternary line signal at the output of the forward filter.

Frequency components of the ternary line signal which remain at the output of high-pass filter 16 (with a cut-off frequency near the pilot frequency) will be attenuated by the phase-locked loop which functions as a narrow band filter around the pilot frequency.

The band limitation of transmission channel 3 between a lower frequency $f_L=0.017f_N$ and a higher frequency $f_H=0.83f_N$ results in the occurrence of intersymbol interference at the output of difference former 11.

The forward filter 10 has for its function to minimize the intersymbol interference at the input of pulse regenerator 12 (output of difference former 11). The amount of intersymbol interference at the input of difference former 11 functions here as the limiting factor.

The pulse response of the forward filter is indicated by h(t) and the pulse response of the forward filter, having a band limitation between a lower frequency $f_L(\omega_L=2\pi f_L)$ and a higher frequency $f_H(\omega_H=2\pi f_H)$, is indicated by $h_\ast(t)$.

It then holds that $$h_\ast(t)=h(t)\ast c(t)\ \text{(convolution)}$$

where:

$$c(t) = \int_{\omega_L}^{\omega_H} \cos \omega t\, d\omega$$

Further it can be written that:

$$h_\ast(t)=h(t)+r(t)$$

where r(t) is a residual term representing the influence of the band limitation.

The forward filter 10 has been designed so that the expression:

$$\epsilon^2(\text{closed loop}) = \frac{\sum_{-V}^{+V} n \neq 0\ r^2(t_o + nT)}{h_\ast^2(t_o)} \quad (3)$$

is at a minimum at a given value of:

$$\epsilon^2(\text{open loop}) = \frac{\sum_{-V}^{+V} n \neq 0\ h_\ast^2(t_o + nT)}{h_\ast^2(t_o)} \quad (4)$$

where $t_o$ is the sampling instant ($t_o=0.9\ T$ in this example).

Herein $\epsilon^2$ (closed loop) is a measure for the intersymbol interference at the output of difference former 11 and $\epsilon^2$ (open loop) is a measure for the intersymbol interference at the input of difference former 11. In these expressions 2V is the number of symbols which is significant for the intersymbol interference (V=40, in this example).

Actually $\epsilon^2$ (closed loop) can be computed for different values of $\epsilon^2$ (open loop) and a value of $\epsilon^2$ (open loop) which still furnishes an acceptable value for $\epsilon^2$ (closed loop) can be determined afterwards. In this embodiment $\epsilon^2$ (open loop) =3.5 and $\epsilon^2$ (closed loop)=0.005 was opted for.

In the simulation of this transmission system it was found that the above-mentioned values for the expressions (3) and (4) correspond to a so-called "eye opening" of 65% and an error multiplication of 17 times.

SECOND EMBODIMENT

FIG. 6a shows a second transmission system for the transmission of data pulses. This system is called a hybrid transmission system by the combined use of analog signal repeaters (line amplifiers) and at least one pulse repeater.

The system comprises a pulse source 40 of binary data pulses which are applied to a first section 41-1 of a coaxial cable. The system comprises a number of sections which are indicated by 41-1, 41-2, . . . 41-60 (60 sections are used in this example). Analog signal repeaters which equalize the frequency characteristic of the preceding section and furnish signal amplification are connected between the sections. These analog signal repeaters are indicated by 42-1, 42-2, . . . 42-60.

The output of the last signal repeater 42-60 is connected to the pulse repeater for binary pulses 43 which, while using quantized feedback, regenerates the binary data pulses for supply to pulse user 44.

Figure 7:
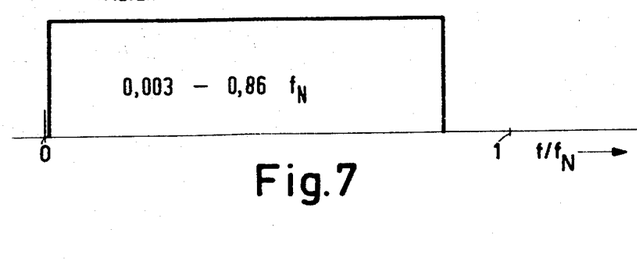
FIG. 7 illustrates the transmission channel frequency band.

A pulse source 40 having a bit rate of 140 Mb/s and a transmission channel having a bandwidth of 200kHz-60 MHz will be discussed as an example. This frequency band is illustrated in FIG. 7, on a normalized frequency scale. In this case the Nyquist frequency $f_N$ amounts to $f_N=70$ MHz.

From FIG. 7 it is evident that the frequency bandwidth of the transmission channel is smaller than the Nyquist frequency.

In the example the coaxial cable is of the small coaxial type. The section length is 2.2 kms and the attenuation at the Nyquist frequency $f_N=70$ MHz is 91.43 dB.

The pulse repeater 43, FIG. 6b, comprises a forward filter 45 which is characterized by a transfer function $H_2(s)$ and is connected between the input 43-1 and an input (+) of a difference former 46. The output thereof is connected to the input of a pulse regenerator 47 for binary pulses. A feedback filter 48, characterized by a transfer function $G_2(s)$, is connected between the output of pulse regenerator 47 and a second input (−) of difference former 46.

Pulse regenerator 47 is controlled by the clock pulses of clock pulse generator 49, which occur at the bit rate of 140 M pulses per second.

In the transmitter, adder 50 adds a pilot signal having a frequency $f_b = \frac{2}{3} f_N = \frac{1}{3} f_s$ ($f_s$ = symbol frequency = 140 MHz) to the binary output signal of pulse source 40. The level of the pilot signal will be low enough in order to interfere only little with the binary line signal.

The pilot signal is obtained from a pilot signal generator 51 which is synchronized with the internal clock (frequency $f_s$) of pulse source 40, which determines the instants at which the binary output pulses occur. The pilot signal can be derived in a suitable manner from this internal clock by dividing the frequency thereof by a factor of 3.

In the clock pulse generator 49, FIG. 6b, the pilot signal is filtered by high-pass filter 52 and then applied to a phase locked loop comprising a phase discriminator 53, a low-pass filter 54, a voltage-controlled oscillator 55 and a frequency divider 56 having a dividing factor of 3. This phase locked loop synchronizes the frequency of oscillator 55 to a frequency which is equal to three times the pilot frequency and, consequently, equal to the symbol frequency. After the output signal of oscillator 55 has been converted by pulse shaper 57 into a pulse train having the same frequency, a series of clock pulses having a pulse repetition rate of 140 M pulses per second appears at the clock pulse output of clock pulse generator 49.

The same conditions (1) and (2) as defined in the first example are applicable here to the transfer functions $H_2(s)$ and $G_2(s)$.

Figure 8A:
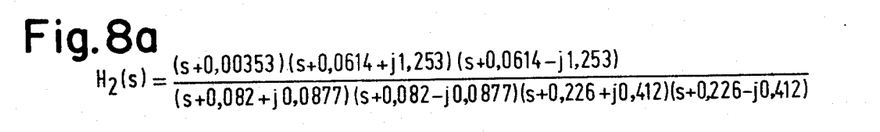
FIG. 8 shows the transfer functions of the forward filter and the feedback filter.
Figure 8B:
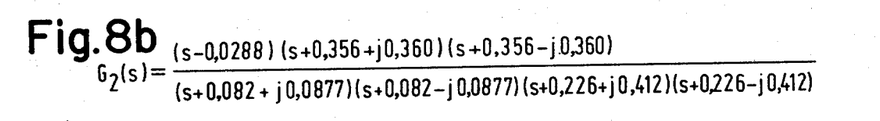

FIG. 8a shows a suitable transfer function $H_2(s)$ and FIG. 8b shows the associated transfer function $G_2(s)$ for $\tau = 1.5T$. In these expressions s represents the normalized frequency variable $s = j\omega/\omega_N$.

Figure 9A:
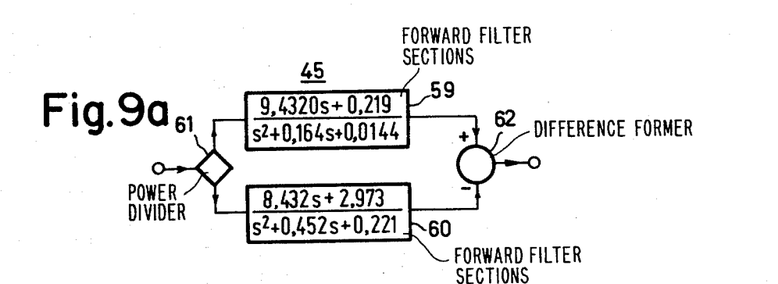
FIG. 9 shows the implementation of the filters.
Figure 9B:
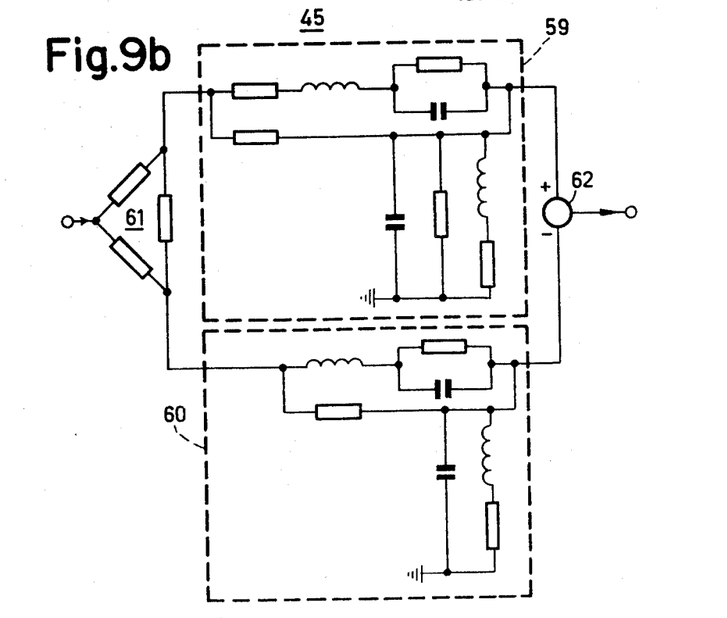
Figure 9C:
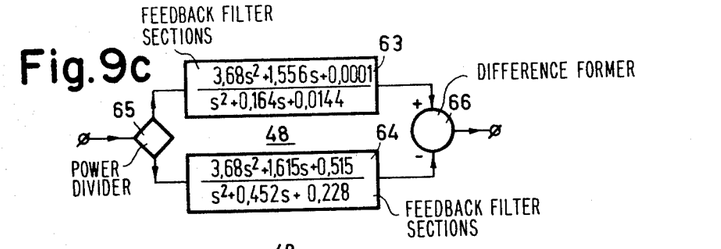

FIG. 9a illustrates the implementation of the forward filter 45 and FIG. 9c illustrates the implementation of the feedback filter 48.

By means of power divider 61, the forward filter 45 is divided into two filter sections 59 and 60 having the transfer functions shown therein in the FIG. 9a, which have been combined by means of difference former 62. The filter sections can be implemented in the form of LCR filters, as illustrated in FIG. 9b.

Figure 9D:
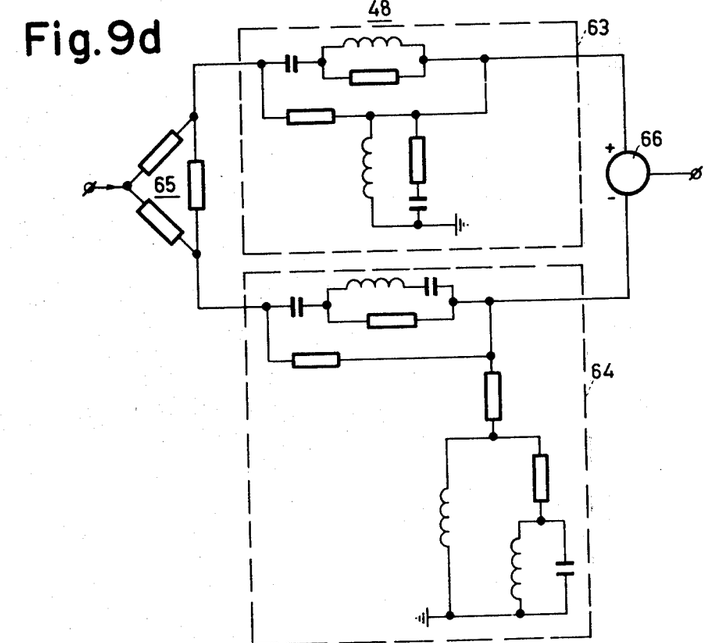

By means of power divider 65 the feedback filter 48 is divided into two filter sections 63 and 64 which are combined by means of difference former 66. These filter sections can be implemented in the manner illustrated in FIG. 9d.

Figure 10:
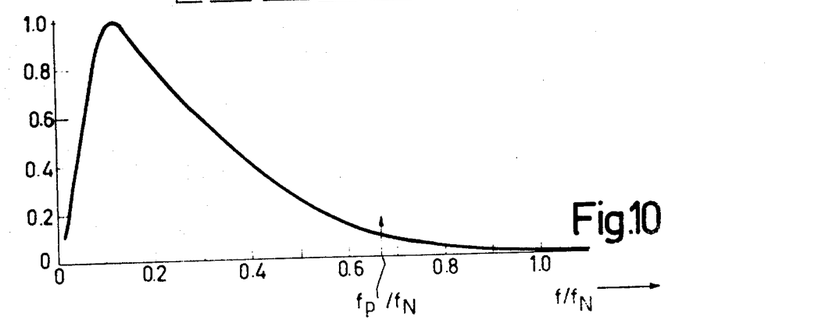
FIG. 10 illustrates the forward filter characteristic.

FIG. 10 shows the amplitude-frequency characteristic of the forward filter shown in FIG. 9a. The position of the pilot frequency $f_b = \frac{2}{3} f_N$ is indicated in FIG. 10. Still more pronounced than in FIG. 5 it appears here that a considerable relative attenuation of the pilot signal occurs, so that at the output of the forward filter only little interference with the binary line signal will still occur.

In the same manner as that in the first example the phase locked loop will here also attenuate signal frequencies which pass through the high-pass filter 52, except in a narrow band around the pilot frequency.

Owing to the band limitation between the lower frequency $f_L = 0.003 \, f_N$ and the higher frequency $f_H = 0.86 \, f_N$ a certain intersymbol interference will remain at the output of difference former 46.

At a limited output power of pulse source 40 and of the analog line amplifiers 41-1, . . . 41-60 the signal-to-noise ratio will also act as a limiting factor in the transmission system.

The forward filter 45 has been designed so that the expression:

$$\epsilon^2 \text{ (closed loop)} + \rho \cdot NS \tag{5}$$

is at a minimum for a given value of:

$$\epsilon^2 \text{ (open loop)},$$

wherein $\epsilon^2$ (closed loop) and $\epsilon^2$ (open loop) are given by the expressions (3) and (4) and the noise-to-signal ratio NS by the expression:

$$NS = \frac{1}{\pi} \int_{\omega_L}^{\omega_H} \frac{N(\omega)|H(\omega)|^2 d\omega}{h_x^2(t_o)} \tag{6}$$

Herein $N(\omega)$ is the noise power spectrum at the input of the forward filter 45 and $H(\omega)$ the transfer function of the forward filter. For the sampling instant $t_o$ it holds in this embodiment that $t_o = 0.9 \, T$.

In the case of a coaxial cable it holds that:

$$N(\omega) = C \cdot \exp\left(2\gamma \sqrt{\frac{\omega}{\omega_N}}\right)$$

where $\gamma$ is equal in this example to $91.43/8.68 = 10.5$ (91.43 dB attenuation at the Nyquist frequency $f = f_N$) and C is a constant which depends inter alia on the number of cable sections.

The factor $\rho$ in the expression (5) enables weighting of the influence of the intersymbol interference, expressed by $\epsilon^2$ (closed loop) relative to the ambient noise, which is included in the expression (6) for the noise-to-signal ratio NS. If the intersymbol interference is considered to be random noise then $\rho$ will have to have the value $\rho = 1$.

Intersymbol interference and noise are, however, different statistical processes and the factor $\rho$ makes it possible to attach more significance to the one than to the other. The factor $\rho = 0$ will result in solutions which are less optimal as regards the signal-to-noise ratio. If the signal-to-noise ratio is small it will be advantageous to have the factor $\rho$ increase.

Actually the optimization of the forward filter can be performed for different values of $\rho$ and the associated signal-to-noise ratio can be determined. Afterwards it can then be determined which values of $\rho$ furnish an acceptable signal-to-noise ratio. In the present embodiment $\rho = 0.4$ appeared to be a suitable value.

At the given value for $\rho$ it is possible to minimize expression (5) for different values of $\epsilon^2$ ((open loop) and to determine thus different values for $\epsilon^2$ (closed loop). Afterwards, a value of $\epsilon^2$ (open loop) can then be determined which still furnishes an acceptable value for $\epsilon^2$ (closed loop). In this case $\epsilon^2$ (open loop) = 3.5 and $\epsilon^2$ (closed loop) = 0.007 has been opted for.

In the simulation of this transmission system it was found that these values for the expressions (3) and (4)

correspond to an eye opening of 75% and an error multiplication of 4 times. A comparison was performed with a linearly equalized transmission system which was optimized as regards to signal-to-noise ratio. This resulted in an improvement of the signal-to-noise ratio by 12 dB relative to linear equalization.

OPTIMALIZATION

As described previously the forward filter has been designed so that the expression $$\epsilon^2(\text{closed loop}) + \rho \cdot NS \tag{5}$$

is at a minimum for a given value of $\epsilon^2$ (open loop) where $\rho=0$ in the first example and $\rho=0.4$ in the second example.

As a first step the impulse response h(t) of the forward filter is developed towards a group of basic functions.

$$h(t) = \sum_{m=0}^{M} a_m \phi_m(t) \tag{7}$$

As a second step a function W is formed:

$$W = \epsilon^2(\text{closed loop}) + \rho \cdot NS + \lambda(c - \epsilon^2(\text{open loop})) \tag{8}$$

where c is a constant to which $\epsilon^2$ (open loop) must become equal and $\lambda$ is the Lagrange multiplier.

If h(t) in the form of expression (7) is introduced into the expressions (3), (4) and (6) and these last-mentioned expressions are introduced into expression (8) and the expression then obtained for W is differentiated to the coefficient $a_m$ and the differentials are set equal to zero, then the following system of M linear equations is the result:

$$\sum_{m=0}^{M} a_m \{R_{ml} + \phi \cdot N_{ml} - \lambda P_{ml}\} = \psi_1(t_o), \, 1 = 0, 1, \ldots M$$

where:

$$P_{ml} = \sum_{-V}^{+V} n \neq 0 \, \psi_m(t_o + nT)\psi_1(t_o + nT)$$

$$R_{ml} = \sum_{-V}^{+V} n \neq 0 \, \{\phi_m(t_o + nT) - \psi_m(t_o + nT)\}\{\phi_1(t_o + nT) - \psi_1(t_o + nT)\}$$

$$N_{ml} = \frac{1}{\pi} \int_{\omega_L}^{\omega_H} N(\omega) \, \Phi_m(\omega) \, \Phi_1(-\omega) d\omega$$

where $\Phi_m(\omega) = F(\phi_m(t))$, (Fourier transform)

$\psi_m(t) = \phi_m(t) * c(t)$, (convolution).

The coefficients $a_m$, which then determine the pulse response h(t) via expression (7) can be computed from these equations. The course of the amplitude-frequency characteristic $|H(\omega)|$ can be determined therefrom. To determine the forward filter an estimate of the location of the transfer function poles can be made from the course of the amplitude-frequency characteristic.

The optimization procedure can now be repeated with the basic functions $\phi_k = a_k \exp(s_k t)$, where $s_k$ is a pole of the transfer function. From the values of $a_k$ then found, the numerator polynominal of the transfer function can be determined directly since the found values of $a_k$ are the residues of the transfer function in the poles $s_k$.

It appeared that for the initial basic functions advantageous can be made of Laguerre functions, which are defined by:

$$\phi_m(t) = L_m(2\sigma t) \exp(-\sigma t)$$

with $$L_m(x) = \frac{e^x}{m!} \frac{d^m(x^m e^{-x})}{dx^m}$$

The constant $\sigma$ can still be chosen in a suitable manner. It appeared that in the two embodiments, $\sigma = \omega_N/2$ is a suitable value ($\omega_N = 2\pi f_N$, $f_N$ = Nyquist frequency).

The factor $\lambda$ is not an unknown quantity but is related to the constant c in accordance with the equation:

$$\epsilon^2(\text{open loop}) + c.$$

Computing $\epsilon^2$ (open loop) will suffice to determine the relation between $\lambda$ and c. Thereafter the value of $\lambda$ can be determined for a given value of the constant c.

What is claimed is:

1. A transmission system for the transmission of data pulses from a transmitter to a receiver through a transmission medium, wherein the transmitter comprises a pulse source connected to the transmission medium for applying n-valent pulses to the transmission medium, which pulses, when passing through the transmission medium give rise to the occurrence of intersymbol interference, these pulses furthermore being affected by noise, wherein the receiver comprises a pulse repeater, connected to the transmission medium, with quantized feedback, comprising a forward filter connected to the transmission medium, a difference former having a first input connected to the forward filter, a pulse regenerator connected to the output of the difference former, a clockpulse source for controlling the pulse regenerator, and a feedback filter connected between the output of the pulse regenerator and a second input of the difference former, wherein means are provided between the pulse source and the transmission medium, in the transmission medium itself and between the transmission medium and the forward filter such that a transmission channel having a uniform transmission characteristic is provided between the pulse source and the forward filter, which transmission channel may be limited between a lower cut-off frequency differing from zero and a higher cut-off frequency differing from infinity, characterized in that the forward filter and the feedback filter are implemented as recursive filters having three or more poles which are the same for both filters in the transfer functions $H_1(s)$ and $G_1(s)$ respectively, each of which being expressed as a quotient $$H_1(s) = N_h(s)/D_h(s)$$

$$G_1(s) = N_g(s)/D_g(s)$$

in which $D_h(s)$ is equal to $D_g(s)$ and the numerator polynomial $N_h(s)$ of the transfer function of the forward filter and the numerator polynomial $N_g(s)$ of the transfer function of the feedback filter are coupled by the group of K linear equations:

$$N_g(s_k) = N_h(s_k) \exp(s_k \tau) \quad k = 1, 2, \ldots K$$

wherein K exceeds two, wherein $s_k$ represents the poles of the transfer function, K represents the number of poles and $\tau$ represents the instant of time at which the regenerated pulse is applied to the feedback filter.

2. A transmission system as claimed in claim 1, wherein the pulse response h(t) of the forward filter results in a minimum of the expression:

$$\epsilon^2 \text{ (closed loop)} + \rho \cdot NS$$

for a given value of the expression:

$$\epsilon^2 \text{ (open loop)}$$

where:

$$\epsilon^2(\text{closed loop}) = \frac{\sum_{-V}^{+V} n \neq 0 \; r^2(t_o + nT)}{h_*^2(t_o)}$$

representing the intersymbol interference at the input of the pulse regenerator, $$NS = \frac{1}{\pi} \int_{\omega_L}^{\omega_H} \frac{N(\omega)|H(\omega)|^2 d\omega}{h_*^2(t_o)}$$

representing the noise-signal ratio $$\epsilon^2(\text{open loop}) = \frac{\sum_{-V}^{+V} n \neq 0 \; h_*^2(t_o + nT)}{h_*^2(t_o)}$$

representing the intersymbol interference at the output of the forward filter,
where:

$h_*(t) = h(t) * c(t)$ (convolution)

$h_*(t) = h(t) + r(t)$ where:

$$c(t) = \int_{\omega_L}^{\omega_H} \cos \omega t \, d\omega$$

and where $\rho$ is a constant enabling weighting of the influence of the intersymbol interference relative to the ambient noise and 2 V is the number of symbols which is significant for the intersymbol interference, $\omega_L$ and $\omega_H$ the cut-off frequencies of the transmission channel, $N(\omega)$ the noise power spectrum at the input of the forward filter and $H(\omega)$ the transfer function and h(t) the pulse response of the forward filter and r(t) a residual term representing the influence of the band limitation.

3. A transmission system for the transmission of pulses as claimed in claim 2, wherein the pulse response h(t) of the forward filter is developed towards a group of basic function $\phi_m(t)$:

$$h(t) = \sum_{m=0}^{M} a_m \phi_m(t)$$

in which $a_m$ is determined from the group of M linear equations $$\sum_{m=0}^{M} a_m \{R_{m1} + \phi \cdot N_{m1} - \lambda P_{m1}\} = \psi_1(t_o), \; 1 = 0, 1, \ldots M$$

where, $$P_{m1} = \sum_{-V}^{+V} n \neq o \; \psi_m(t_o + nT)\psi_1(t_o + nT)$$

$$R_{m1} = \sum_{-V}^{+V} n \neq o \; \{\phi_m(t_o + nT) - \psi_m(t_o + nT)\}\{\phi_1(t_o + nT) - \psi_1(t_o + nT)\}$$

$$N_{m1} = \frac{1}{\pi} \int_{\omega_L}^{\omega_H} N(\omega) \Phi_m(\omega) \Phi_1(-\omega) d\omega$$

where $\Phi_m(\omega) = F(\phi_m(t))$ (Fourier transform)

$\psi_m(t) = \phi_m(t) * c(t)$ (convolution)

$\phi_m(t) = L_m(2\sigma t) \exp(-\sigma t)$ (basic function)

$L_m(x) = \frac{e^x}{m!} \frac{d^m(x^m e^{-x})}{dx^m}$ (Laguerre Function)

and where $\delta = \omega N/s$ and $\lambda$ is the Lagrange multiplier related to the constant c in the equation $\epsilon^2(\text{open loop}) = c$.

* * * * *

UNITED STATES PATENT AND TRADEMARK OFFICE
CERTIFICATE OF CORRECTION

PATENT NO. : 4,251,886
DATED : Feb. 17, 1981
INVENTOR(S) : ENGEL ROZA

It is certified that error appears in the above-identified patent and that said Letters Patent is hereby corrected as shown below:

Column 12, line 23 (Claim 3)

"$\phi$" should be --$\rho$-- (Greek - rho)

Column 12, line 43 (Claim 3)

"M1" should be --m!--.

Signed and Sealed this

Twenty-ninth Day of May 1984

[SEAL]

Attest:

GERALD J. MOSSINGHOFF

Attesting Officer   Commissioner of Patents and Trademarks